United States Patent
Yamaguchi et al.

(10) Patent No.: US 10,011,258 B2
(45) Date of Patent: Jul. 3, 2018

(54) MONITORING APPARATUS AND MONITORING SYSTEM

(71) Applicant: FUJI XEROX CO., LTD., Tokyo (JP)

(72) Inventors: Shoji Yamaguchi, Kanagawa (JP); Masayasu Takano, Kanagawa (JP); Daigo Kusano, Kanagawa (JP)

(73) Assignee: FUJI XEROX CO., LTD., Tokyo (JP)

(*) Notice: Subject to any disclaimer, the term of this patent is extended or adjusted under 35 U.S.C. 154(b) by 55 days.

(21) Appl. No.: 15/222,720

(22) Filed: Jul. 28, 2016

(65) Prior Publication Data

US 2017/0240158 A1 Aug. 24, 2017

(30) Foreign Application Priority Data

Feb. 22, 2016 (JP) ................... 2016-030962

(51) Int. Cl.
*G06Q 30/02* (2012.01)
*B60T 17/22* (2006.01)
*B60C 9/00* (2006.01)
*B62D 15/02* (2006.01)
*G07C 5/02* (2006.01)
*G07C 5/08* (2006.01)

(52) U.S. Cl.
CPC ............ *B60T 17/22* (2013.01); *B60C 9/00* (2013.01); *B62D 15/02* (2013.01); *G07C 5/02* (2013.01); *G07C 5/08* (2013.01); *B60T 2210/10* (2013.01); *B60T 2210/30* (2013.01)

(58) Field of Classification Search
CPC ........................................ B60T 17/22
USPC .................. 340/903, 438, 439, 435
See application file for complete search history.

(56) References Cited

U.S. PATENT DOCUMENTS

| | | | |
|---|---|---|---|
| 2008/0273750 A1* | 11/2008 | Fujimoto | G06K 9/00362 382/103 |
| 2015/0356635 A1* | 12/2015 | Thurston | B60Q 9/00 705/306 |
| 2016/0016584 A1* | 1/2016 | Pfeiffer | B60W 30/16 701/34.1 |
| 2016/0236691 A1* | 8/2016 | Armitage | B60W 40/09 |

FOREIGN PATENT DOCUMENTS

| JP | 2010-014498 A | 1/2010 |
|---|---|---|
| JP | 2011-028609 A | 2/2011 |

\* cited by examiner

*Primary Examiner* — Brent Swarthout
(74) *Attorney, Agent, or Firm* — Oliff PLC

(57) ABSTRACT

Provided is a monitoring apparatus including an acquiring unit that acquires information relating to an operation status when an operating body is operated, a determination unit that determines one of plural categories of the operation status, which are classified based on a degree of occurrence of a malfunction of the operating body or a degree of danger of the operation status, to which the information relating to the operation status acquired by the acquiring unit belongs, and an attention calling unit that calls for an attention for an operation of the operating body in a case where the information relating to the operation status is determined to belong to a specific category.

14 Claims, 8 Drawing Sheets

MONITORING APPARATUS AND MONITORING SYSTEM

CROSS-REFERENCE TO RELATED APPLICATIONS

This application is based on and claims priority under 35 USC 119 from Japanese Patent Application No. 2016-030962 filed Feb. 22, 2016.

BACKGROUND

Technical Field

The present invention relates to a monitoring apparatus and a monitoring system.

SUMMARY

According to an aspect of the invention, there is provided a monitoring apparatus including:

an acquiring unit that acquires information relating to an operation status when an operating body is operated;

a determination unit that determines one of plural categories of the operation status, which are classified based on a degree of occurrence of a malfunction of the operating body or a degree of danger of the operation status, to which the information relating to the operation status acquired by the acquiring unit belongs; and an attention calling unit that calls for an attention for an operation of the operating body in a case where the information relating to the operation status is determined to belong to a specific category.

BRIEF DESCRIPTION OF THE DRAWINGS

Exemplary embodiments of the present invention will be described in detail based on the following figures, wherein.

DETAILED DESCRIPTION (Vehicle Configuration)

Figure 1:
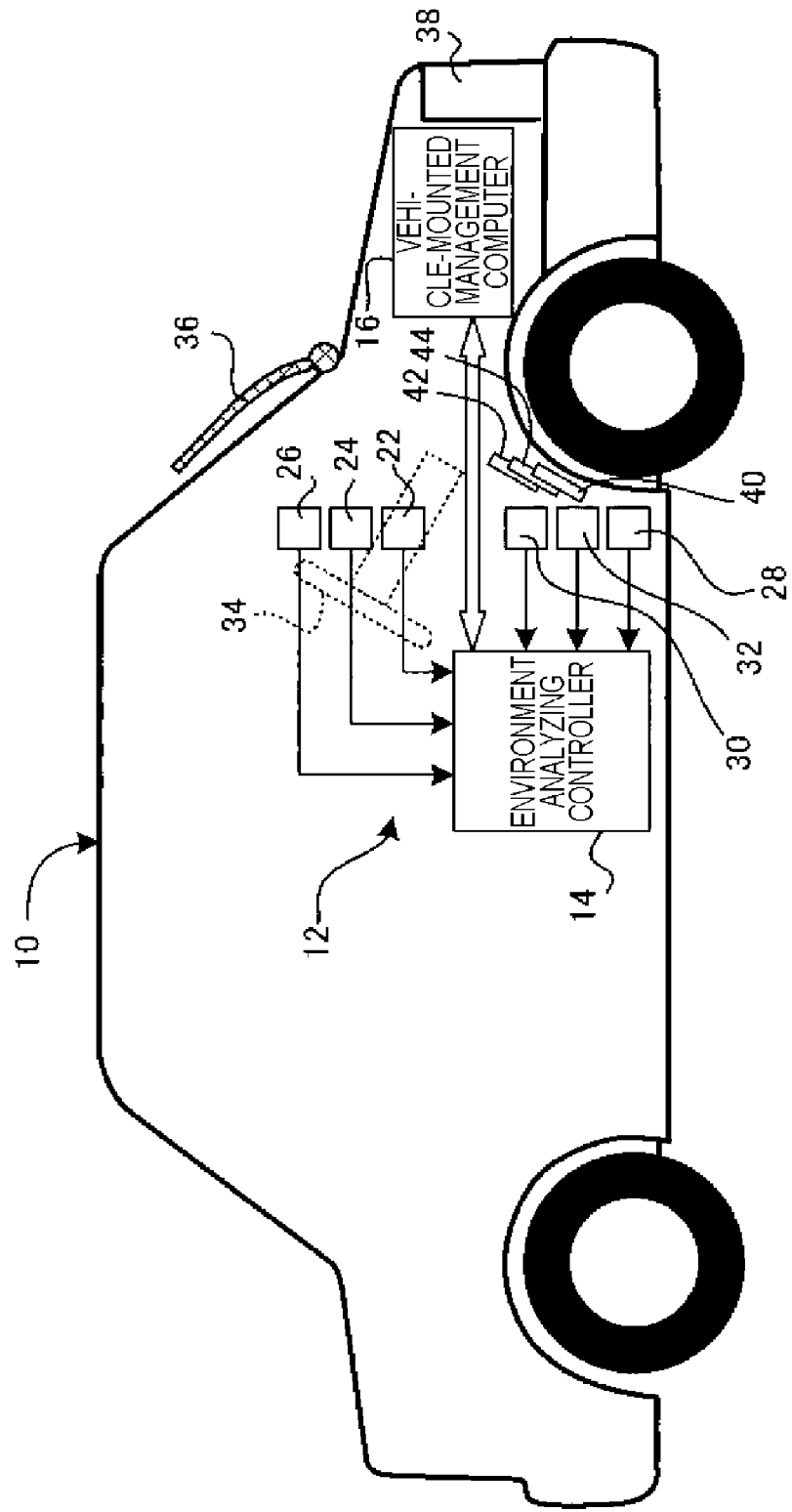
FIG. 1 is a side view of a vehicle as a moving body according to the present exemplary embodiment.

FIG. 1 illustrates a vehicle 10 as an operating body according to the present exemplary embodiment.

A monitoring apparatus 12 is mounted in the vehicle 10 monitoring the operation status of the vehicle 10.

The monitoring apparatus 12 includes an environment analyzing controller 14. The environment analyzing controller 14 is connected to a vehicle-mounted management computer 16 that is originally mounted in the vehicle 10.

Figure 6:
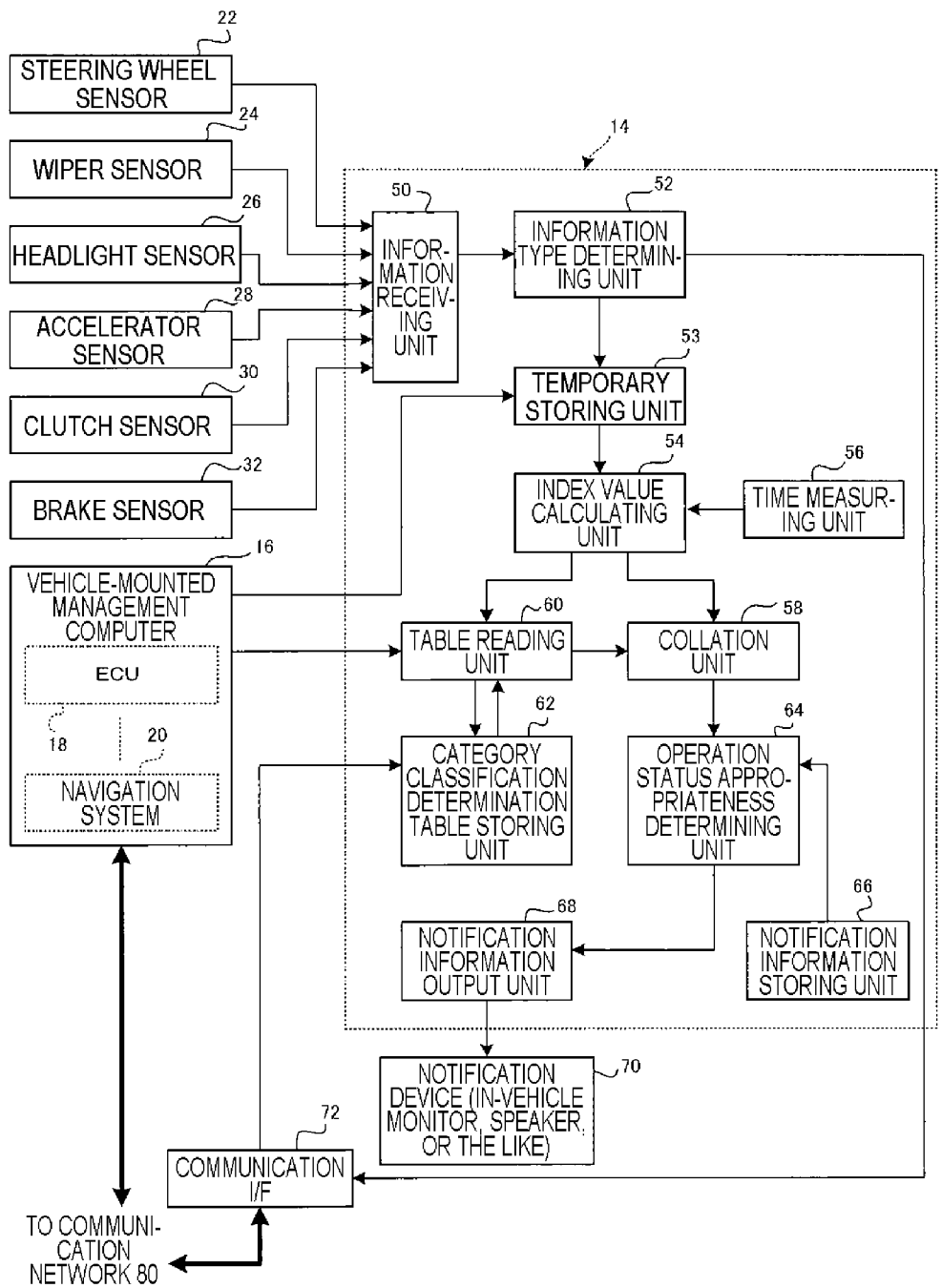
FIG. 6 is a block diagram that illustrates a control for performing an analysis of state information and a determination of replacement time of consumables for each function in an environment analyzing controller according to the present exemplary embodiment.

The vehicle-mounted management computer 16 includes, for example, an engine control unit (ECU) 18 and a navigation system 20 (see, e.g., FIG. 6).

The environment analyzing controller 14 is configured to acquire information relating to a traveling environment from the vehicle-mounted management computer 16.

The traveling environment is a combination of a traveling road surface (including an expressway, a general paved road, a general unpaved road, and a mountain unpaved road surface (climbing road)) and a period of time (day and night). For example, a traveling status may be acquired from the navigation system 20 (see, e.g., FIG. 6) that is a part of the vehicle-mounted management computer 16. In addition, region information including a region in which the vehicle 10 travels and the weather of the region may be acquired from the navigation system 20, a weather information transmitting source provided through a communication network, a radio broadcast, or the like.

As illustrated in FIG. 1, a steering wheel sensor 22, a wiper sensor 24, a headlight sensor 26, an accelerator sensor 28, a clutch sensor 30 and a brake sensor 32 are connected to the environment analyzing controller 14 as detection units.

The steering wheel sensor 22 detects an operation state of a steering wheel 34 of the vehicle 10 (e.g., a rotation speed for steering and the number of times of steering). Here, the number of times of steering is so-called the number of times of turning back the steering wheel 34.

The wiper sensor 24 detects the operation state of a wiper 36 of the vehicle 10. According to a detection signal acquired by the wiper sensor 24, it may be recognized that the vehicle 10 travels in the rain.

The headlight sensor 26 detects an operation (on/off) state of a headlight 38 of the vehicle 10. With the detection signal acquired by the headlight sensor, it may be recognized that the vehicle 10 travels at night.

The accelerator sensor 28 detects a stepping operation state of the accelerator pedal 40 of the vehicle 10 (e.g., the number of times of stepping or a stepping speed).

The clutch sensor 30 detects a stepping operation state of a clutch pedal 42 of the vehicle 10 (e.g., the number of times of stepping or a stepping speed). It is apparent that the clutch sensor 30 is not present in an automatic vehicle. In case of an automatic vehicle where information equivalent to information acquired by the clutch sensor 30 is necessary, information of a gear ratio that is electrically controlled automatically or manually from the ECU 18 may be read.

The brake sensor 32 detects a stepping operation state of a brake pedal 44 of the vehicle 10 (e.g., the number of times of stepping, or a stepping speed).

(Analysis of Operation Status)

In the present exemplary embodiment, as an example of a parameter used for monitoring the operation status of the vehicle 10, detection signals detected from the steering wheel sensor 22, the accelerator sensor 28, and the brake sensor 32 are applied. In addition, there are cases where detection signals detected from the wiper sensor 24, the headlight sensor 26, and the clutch sensor 30 are accessorily applied so as to recognize traveling environments.

The environment analyzing controller 14 acquires information relating to the following operation statuses based on the detection signals detected from the steering wheel sensor 22, the accelerator sensor 28, and the brake sensor 32.

(Steering Wheel Sensor 22)

Based on a detection signal detected from the steering wheel sensor 22, information relating to the rotation speed for steering and the number of times of steering is acquired in units of periods set in advance.

(Accelerator Sensor 28)

Based on a detection signal detected from the accelerator sensor 28, information relating to the number of times of stepping and information relating to an average value of operation speeds at the time of stepping are acquired in units of periods set in advance.

(Brake Sensor 32)

Based on a detection signal detected from the brake sensor 32, information relating to the number of times of stepping and information relating to an average value of operation speeds at the time of stepping are acquired in units of periods set in advance.

Here, the periods for which each information is acquired, for example, may overlap with each other such as a period from the first of this month to the first of the next month and a period from the fifth of this month to the fifth of the next month. In other words, when a shift between the periods is configured in a small unit (e.g., in the unit of one second), theoretically, information according to a period of real time may be acquired. In addition, the period may be converted into a traveling distance of the vehicle 10.

While not employed in the present exemplary embodiment, for a vehicle 10 of a manual operation, information similar to that for the accelerator sensor 28 and the brake sensor 32 may be acquired also for the clutch sensor 30 and added to the parameters.

In addition, by using a detection signal detected from the wiper sensor 24, information relating to an operation status of the wiper for an environment (in the rain) may be acquired and added to the parameters.

In addition, by using a detection signal detected from the headlight sensor 26, information relating to an operation status of the headlight with respect to driving time may be acquired and added to the parameters.

(Acquisition of Traveling Environment)

Figure 2A:
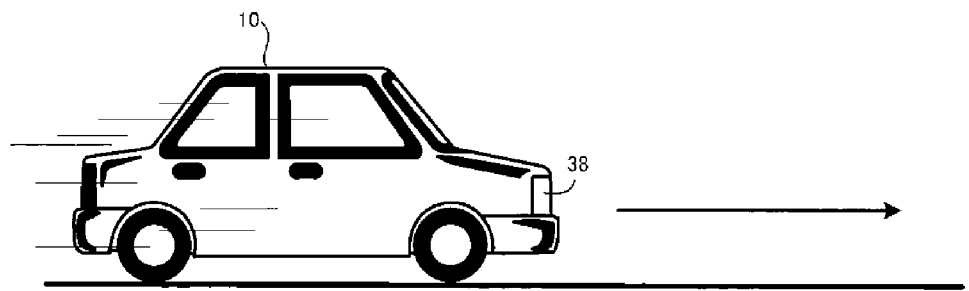
FIGS. 2A and 2B are side views that illustrate traveling states of a vehicle as an example of a moving body in which parts consumed according to an operation are used according to the present exemplary embodiment.
Figure 2B:
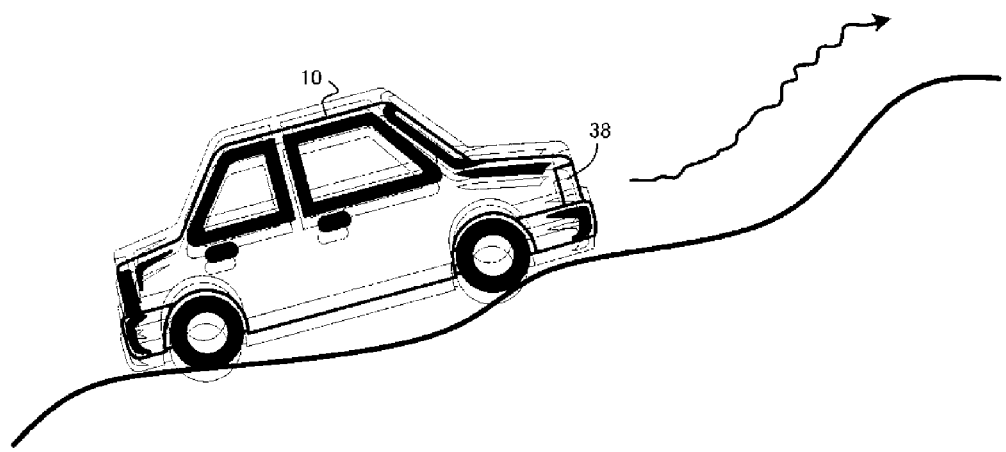

FIGS. 2A and 2B illustrate traveling environments (road surface statuses) of the vehicle 10.

FIG. 2A illustrates a state in which the vehicle 10 travels on an expressway or a general paved road. In the meantime, FIG. 2B illustrates a state in which the vehicle 10 travels on a general unpaved road or a mountain unpaved road (climbing road).

The traveling status of the vehicle 10 may be a factor having a high influence on the degree of the occurrence of a malfunction including an accident and a breakdown. For example, the number of times of shift changing, the rotation number (angle) of the steering wheel, the number of times of operating a brake, and the number of times of stepping the accelerator may be substantially different between the traveling state illustrated in FIG. 2A and the traveling state illustrated in FIG. 2B.

Figure 3A:
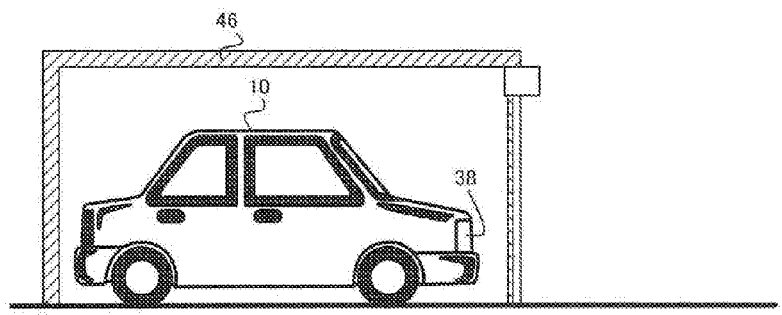
FIGS. 3A to 3C are side views of a vehicle placed under various peripheral environment states according to the present exemplary embodiment.
Figure 3B:
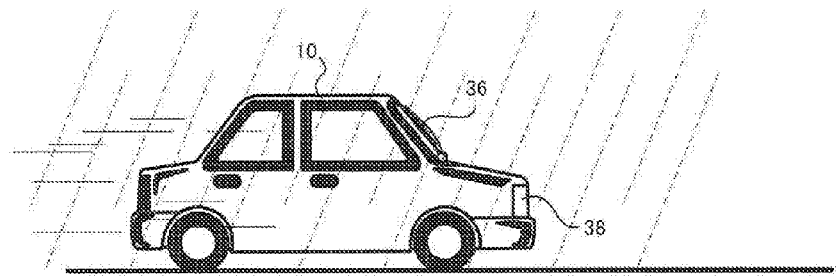
Figure 3C:
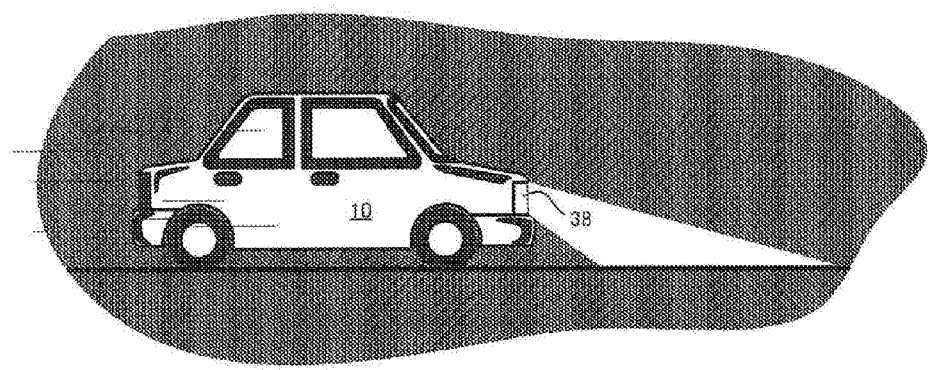

FIGS. 3A to 3C illustrate traveling environments (peripheral environments) of the vehicle 10.

The environment in which the vehicle 10 is placed may be a factor having a high influence on the degree of the occurrence of a malfunction including an accident and breakdown.

FIG. 3A is an environment in which the vehicle 10 is stored in a hangar 46 such as a parking lot or a garage and does not move in a state in which the engine is turned off.

For example, in a case where a vehicle is not operated for an extended period in a state of being stored in a garage or the like, an accident may not occur during the negligence period. However, in a case where the negligence period becomes long, due to the power consumption including discharge and the leakage and the deterioration of a battery according to an elapse of time, a malfunction of decreasing the voltage of the battery may occur (see, e.g., FIG. 3A).

FIG. 3B illustrates an environment in which the vehicle 10 travels under a bad weather (in the rain, snow, or the like), and the wiper 36 is operated.

For example, under the bad weather, the slip and the like of a tire may occur more easily than under a good weather, and the braking distance tends to increase (see, e.g., FIG. 3B).

FIG. 3C illustrates an environment in which the vehicle 10 travels at night or inside a tunnel, and the headlight 38 is in the ON state.

For example, at night or in a case where the ratio of tunnel traveling is high, the field of vision and visibility of a driver (operator) are degraded more than those at daytime, and an obstacle tends to be found or recognized with a delay (see, e.g., FIG. 3C).

Thus, in the present exemplary embodiment, in order to perceive (predict) a traveling status and a traveling environment, the monitoring apparatus 12 is mounted in the vehicle 10.

In addition, by acquiring GPS information and date and time information from the navigation system 20 and analyzing such information, the position and the traveling date and time of the own vehicle may be specified as the traveling environment. Furthermore, the weather may be specified as necessary based on information supplied from the navigation system 20, a weather information transmitting source provided through a communication network, a radio broadcast, or the like.

(Providing Information of Traveling Status)

As illustrated in FIG. 1, the environment analyzing controller 14 transmits information relating to an operation status based on each of the sensors described above (the steering wheel sensor 22, the wiper sensor 24, the headlight sensor 26, the accelerator sensor 28, the clutch sensor 30, and the brake sensor 32) to a collective management server 82 (see, e.g., FIG. 4) to be described later.

In addition, the vehicle-mounted management computer 14 transmits information relating to the traveling environment of the vehicle 10 to the collective management server 82 (see, e.g., FIG. 4) to be described later.

The collective management server 82 receives the information relating to the operation status and the traveling environment from each vehicle 10, aggregates malfunction information including accidents and breakdowns of vehicles 10, generates a category classification determination table (see, e.g., Tables 1 to 4 to be described later) as a correlation table used for determining the appropriateness of the traveling state for each traveling parameter of each vehicle 10, for example, by performing a cluster analysis, and transmits the category classification determination table to each vehicle 10.

In addition, a latest category classification determination table may be stored as a default value at the time of shipment of the vehicle 10 (regardless of a brand new car or a used car) in which the monitoring apparatus 12 according to the present exemplary embodiment is mounted.

(Information Analysis)

Figure 4:
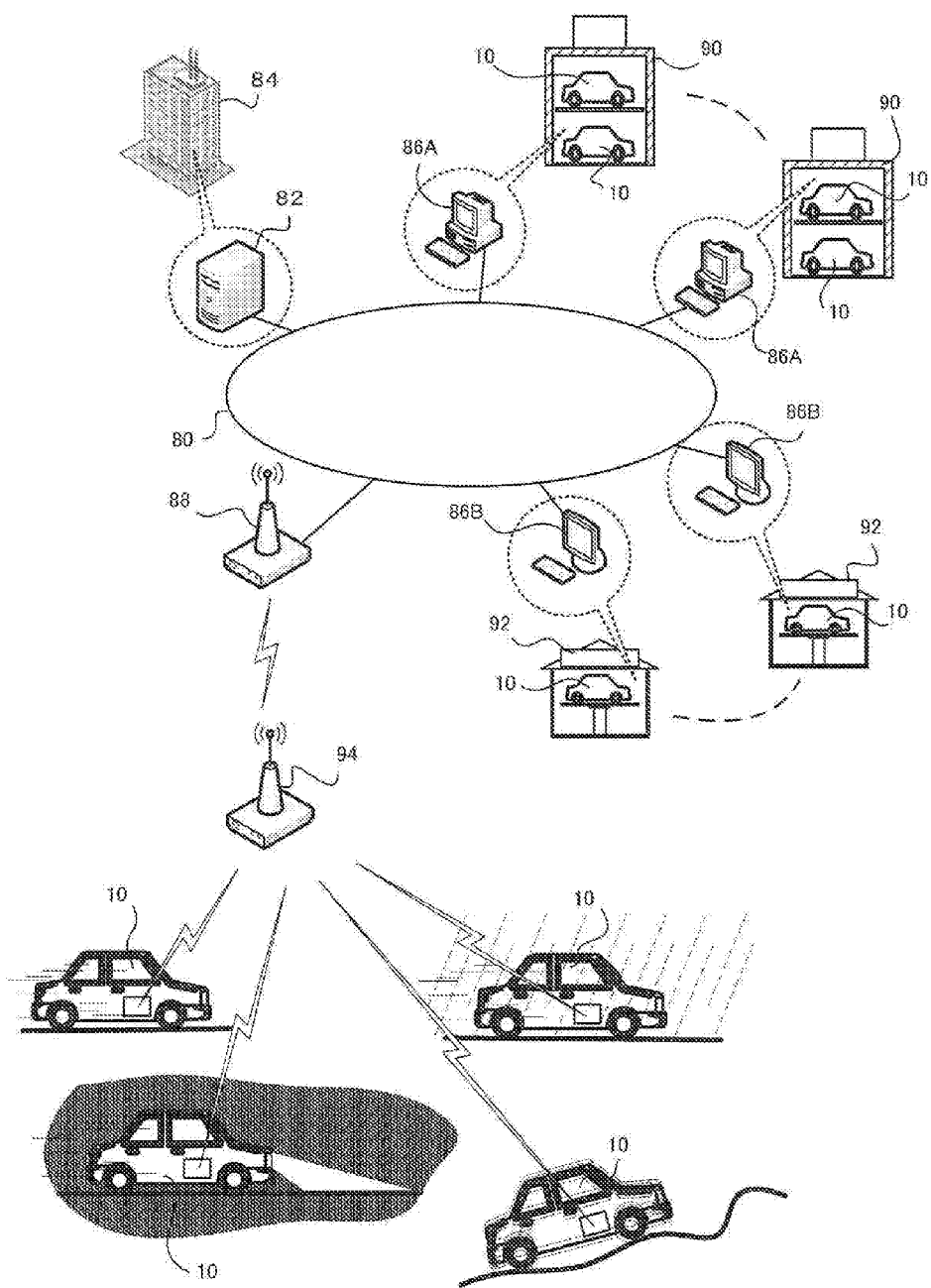
FIG. 4 is a diagram illustrating a monitoring system that accumulates data collectively from monitoring apparatuses mounted in vehicles through a communication network and achieves an optimization of replacement time of consumables according to the present exemplary embodiment.

FIG. 4 illustrates a monitoring system that is used for determining the appropriateness of the operation status by accumulating data collectively from monitoring apparatuses 12 mounted in vehicles 10 through a communication network 80 and building a category classification determination table used for determining the appropriateness of the traveling status.

As the communication network 80 of the monitoring system, the Internet, the WAN, or the LAN is representatively used.

A collective management server 82 is connected to the communication network 80. The collective management server 82, for example, is disposed at a manufacturer's office building 84 of the vehicle 10 and acquires the state information of each vehicle 10 from vehicles 10 that are present in all the regions to which the vehicles 10 are distributed or a specific region.

In addition, PCs 86A and 86B that are communication terminals and a wireless communication device 88 are connected to the communication network 80.

Each of the PCs 86A is disposed at a base maintenance factory 90 of a selling distributor (dealer) of the vehicle 10. And, at a time point when a maintenance request of a vehicle 10 is received, the traveling status information of the maintenance vehicle 10 is transmitted to the collective management server 82 through the PC 86A.

The PC 86B is disposed at a so-called private maintenance factory 92. And, at a time point when a maintenance request of a vehicle 10 is received, the traveling status information of the maintenance vehicle 10 is transmitted to the collective management server 82 through the PC 86B.

The wireless communication device 88 may communicate with the communication base stations 94 arranged in all the regions to which the vehicles 10 are distributed or a specific region.

The information relating to the operation status is transmitted from a communication I/F 72 (see, e.g., FIG. 6) disposed in the monitoring apparatus 12 of each vehicle 10 to each communication base station 94. For this reason, also in a case where a maintenance request is not made for a base maintenance factory 90 or a private maintenance factory 92, the collective management server 82 may receive routine traveling status information of vehicles 10 in a communication range of the communication base station 94. For this reason, in the collective management server 82, the information is managed as so-called big data relating to the vehicles 10.

(Generation of Category Classification Determination Table)

The collective management server 82 generates category classification determination tables illustrated in Tables 1 to 4. The category classification determination tables aggregate information relating to the operation statuses from plural vehicles 10 and information relating to malfunctions including accidents and breakdowns of the vehicles 10, and set ranges according to the occurrence probabilities of malfunctions for each category through, for example, a cluster analysis.

Figure 5:
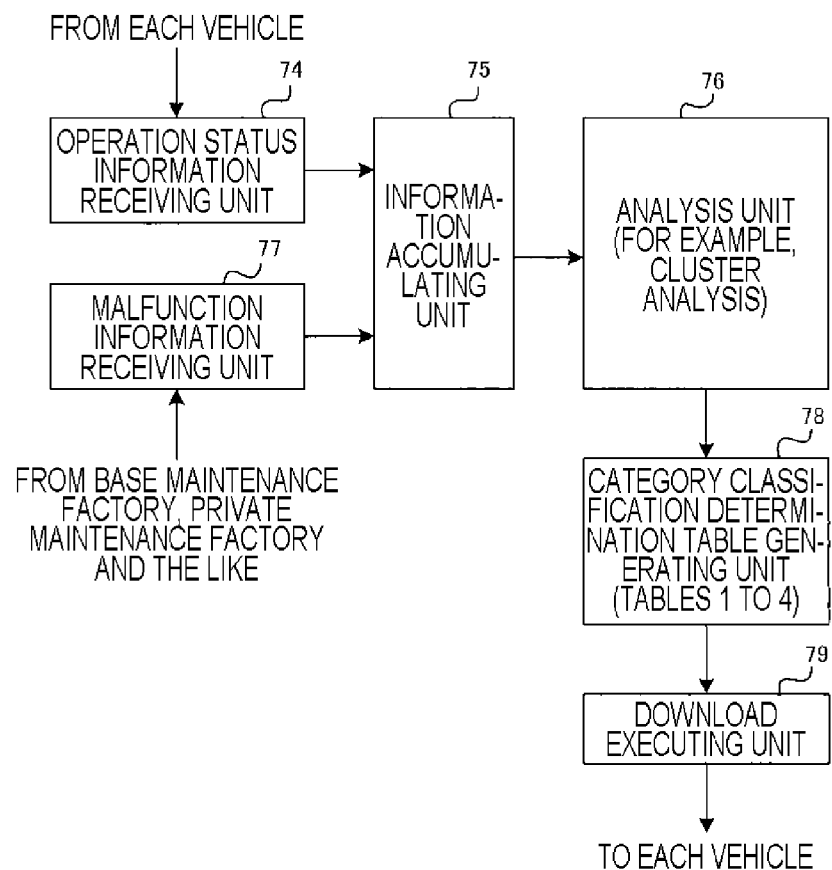
FIG. 5 is a diagram that illustrates functional blocks for data analysis control in a collective management server according to the present exemplary embodiment.

FIG. 5 is a block diagram that illustrates a control for generating category classification determination tables for each function in the collective management server 82.

The operation status transmitted from each vehicle 10 is received by an operation status information receiving unit and is temporarily accumulated in an information accumulating unit 75. In addition, a malfunction information receiving unit 77 receives malfunction information including accidents and breakdowns from the base maintenance factories 90 and the private maintenance factories 92, and temporarily accumulates the malfunction information in the information accumulating unit 75. Here, the malfunction information is not limited to be received from the base maintenance factories 90 and the private maintenance factories 92, but may be directly received from the vehicles 10 or, for example, accident information may be acquired in association with a public organization (the police station or the like) or insurance companies.

When it becomes an analysis period set in advance, the information accumulated in the information accumulating unit (the operation status information and the malfunction information) is transmitted to an analysis unit 76.

The analysis unit 76 performs, for example, a cluster analysis based on the information relating to the operation statuses and the information relating to the malfunctions including accidents and breakdowns that have been received. In the cluster analysis, a vector having a feature quantity of the received information is generated, and a cluster of operation statuses in which an accident or a breakdown occurs is specified, and the frequencies of the operation statuses (the number of operations, the operation speed, or the like) are classified into categories.

Here, a method for classifying the frequencies of operation statuses into categories is not limited to the cluster analysis, but a simple statistical calculation may be used.

The analysis unit 76 transmits a result of the analysis to a category classification determination table generating unit 78. The category classification determination table generating unit 78, as illustrated in Tables 1 to 4 presented below, generates a category classification determination table of operation statuses for each traveling environment.

The information accumulating unit 75, the analysis unit 76, and the category classification determination table generating unit 78 described above serve as a generation unit.

The generated category classification determination tables are transmitted to each vehicle 10 by a download executing unit 79 that is an example of a notification unit. The period of this download is not particularly limited. Thus, the download may be performed once (e.g., at the time of delivery of a brand new car or a used car), and the category classification determination tables may be updated regularly or irregularly over plural number of times. As the interval of the download execution period decreases, the appropriateness of the operation status may be determined with a higher accuracy.

Tables 1 to 4 represent category classification determination table data acquired by assuming that the vehicle travels on the roads having mutually-different environments.

In the category classification marks of Tables 1 to 4, a leading alphabet is an abbreviation of "Category", and, as a number disposed in the middle, "1" represents an expressway, "2" represents a general paved road, "3" represents a general unpaved road, and "4" represents a mountain unpaved road. In addition, alphabets a to e disposed at the end represent levels of the degrees representing good/bad traveling statuses (a to e).

In addition, numerical values written in Tables 1 to 4 are percentage values (index values) having each standard state (recommendation value) as 100. An index value is a relative value of an execution frequency within the period described above when a recommendation value of each operation parameter is set to 100 in advance. In this exemplary embodiment, in all the categories, a recommendation value of 100 is included in the level c. In addition, in this exemplary embodiment, while the range of the index value of each category is the same, the range of the index value of each category may be set differently for each parameter.

Table 1 represents category classification determination table data acquired by assuming that the vehicle travels on an expressway.

TABLE 1

EXPRESSWAY DETERMINATION TABLE

| Parameter | Category classification | | | | |
|---|---|---|---|---|---|
| | C1a | C1b | C1c | C1d | C1e |
| Brake stepping average speed | 70 or less | 71 to 90 | 91 to 110 | 111 to 130 | 131 or more |
| Accelerator stepping average speed | 70 or less | 71 to 90 | 91 to 110 | 111 to 130 | 131 or more |
| Rotating speed of steering wheel | 70 or less | 71 to 90 | 91 to 110 | 111 to 130 | 131 or more |
| Number of times of stepping brake | 70 or less | 71 to 90 | 91 to 110 | 111 to 130 | 131 or more |
| Number of times of stepping accelerator | 70 or less | 71 to 90 | 91 to 110 | 111 to 130 | 131 or more |
| Number of times of steering steering wheel | 70 or less | 71 to 90 | 91 to 110 | 111 to 130 | 131 or more |

Table 2 represents category classification determination table data acquired by assuming that the vehicle travels on a general paved road. In a case where the vehicle travels on a general paved road, the number of operations and the operation speed tend to be more than those acquired in a status in which the vehicle travels on the expressway represented in Table 1, and thus, the width of the index value of the category classification is set to be narrow.

TABLE 2

GENERAL PAVED ROAD DETERMINATION TABLE

| Parameter | Category classification | | | | |
|---|---|---|---|---|---|
| | C2a | C2b | C2c | C2d | C2e |
| Brake stepping average speed | 60 or less | 61 to 80 | 81 to 120 | 121 to 150 | 151 or more |
| Accelerator stepping average speed | 60 or less | 61 to 80 | 81 to 120 | 121 to 150 | 151 or more |
| Rotating speed of steering wheel | 60 or less | 61 to 80 | 81 to 120 | 121 to 150 | 151 or more |
| Number of times of stepping brake | 60 or less | 61 to 80 | 81 to 120 | 121 to 150 | 151 or more |
| Number of times of stepping accelerator | 60 or less | 61 to 80 | 81 to 120 | 121 to 150 | 151 or more |
| Number of times of steering steering wheel | 60 or less | 61 to 80 | 81 to 120 | 121 to 150 | 151 or more |

Table 3 represents category classification determination table data acquired by assuming that the vehicle travels on a general unpaved road. In a case where the vehicle travels on a general unpaved road, the number of operations and the operation speed tend to be more than those acquired in a status in which the vehicle travels on the general paved road represented in Table 2, and thus, the width of the index value of the category classification is set to be narrow.

TABLE 3

GENERAL UNPAVED ROAD DETERMINATION TABLE

| Parameter | Category classification | | | | |
|---|---|---|---|---|---|
| | C3a | C3b | C3c | C3d | C3e |
| Brake stepping average speed | 50 or less | 51 to 70 | 71 to 150 | 151 to 200 | 201 or more |
| Accelerator stepping average speed | 50 or less | 51 to 70 | 71 to 150 | 151 to 200 | 201 or more |
| Rotating speed of steering wheel | 50 or less | 51 to 70 | 71 to 150 | 151 to 200 | 201 or more |
| Number of times of stepping brake | 50 or less | 51 to 70 | 71 to 150 | 151 to 200 | 201 or more |
| Number of times of stepping accelerator | 50 or less | 51 to 70 | 71 to 150 | 151 to 200 | 201 or more |
| Number of times of steering steering wheel | 50 or less | 51 to 70 | 71 to 150 | 151 to 200 | 201 or more |

Table 4 represents category classification determination table data acquired by assuming that the vehicle travels on a mountain unpaved road. In a case where the vehicle travels on a mountain unpaved road, the number of operations and the operation speed tend to be more than those acquired in a status in which the vehicle travels on the general unpaved road represented in Table 3, and thus, the width of the index value of the category classification is set to be narrow.

TABLE 4

MOUNTAIN UNPAVED ROAD DETERMINATION TABLE

| Parameter | Category classification | | | | |
|---|---|---|---|---|---|
| | C4a | C4b | C4c | C4d | C4e |
| Brake stepping average speed | 40 or less | 41 to 60 | 61 to 160 | 161 to 210 | 211 or more |
| Accelerator stepping average speed | 40 or less | 41 to 60 | 61 to 160 | 161 to 210 | 211 or more |

TABLE 4-continued

MOUNTAIN UNPAVED ROAD DETERMINATION TABLE

| Parameter | Category classification | | | | |
|---|---|---|---|---|---|
| | C4a | C4b | C4c | C4d | C4e |
| Rotating speed of steering wheel | 40 or less | 41 to 60 | 61 to 160 | 161 to 210 | 211 or more |
| Number of times of stepping brake | 40 or less | 41 to 60 | 61 to 160 | 161 to 210 | 211 or more |
| Number of times of stepping accelerator | 40 or less | 41 to 60 | 61 to 160 | 161 to 210 | 211 or more |
| Number of times of steering steering wheel | 40 or less | 41 to 60 | 61 to 160 | 161 to 210 | 211 or more |

The collective management server 82 stores the generated category classification determination tables (Tables 1 to 4) in category classification determination tables 62 of each vehicle through the communication network 80, the wireless communication device 88, the radio base station 94, and the communication I/F 72 of each vehicle 10.

Here, the storage may be appropriately updated.

(Determination of Appropriateness of Traveling Status)

The monitoring apparatus 12 acquires information (state information including an operation time) at the time of the operation as an operation parameter according to an operator of the vehicle 10, determines the appropriateness of the operation status of the operator by comparing the frequency of each operation parameter for each period set in advance with the determination tables represented in Tables 1 to 4, and, based on a result of the determination result (particularly, in a case where the operation status is not desirable), gives a notification for improving the operation status.

In addition, there are cases where, in a case where the operation status is dangerous, a calling for an attention such as applying a vibration to the seat or the steering wheel or turning on a hazard lamp is performed.

(Providing Information and Monitoring Control)

FIG. 6 is a block diagram that illustrates a monitoring control for performing an analysis of an operation status, acquisition of a traveling environment, and providing information of a traveling status and a determination of the appropriateness of the traveling status in the environment analyzing controller 14 illustrated in FIG. 1 for each function. Here, the blocks illustrated in FIG. 6 are classified for each function, and the hardware configuration of the environment analyzing controller 14 is not limited thereto.

As illustrated in FIG. 6, the environment analyzing controller 14 includes an information receiving unit 50. The steering wheel sensor 22, the wiper sensor 24, the headlight sensor 26, the accelerator sensor 28, the clutch sensor 30, and the brake sensor 32 are connected to the information receiving unit 50, and the information receiving unit 50 receives state information.

In the present exemplary embodiment, while category classification determination tables are generated by mainly applying detection signals detected from the steering wheel sensor 22, the accelerator sensor 28, and the brake sensor 32 as information providing sources, any one or more of the wiper sensor 24, the headlight sensor 26, and the clutch sensor 30 may be added as the information providing sources.

The information receiving unit 50 that is an example of an acquiring unit is connected to an information type determining unit 52, and the state information received by the information receiving unit 50 is transmitted to the information type determining unit 52. The information type determining unit 52 classifies information for each operation parameter based on the acquired state information.

The information type determining unit 52 is connected to the communication I/F 72 and an index value calculating unit 54.

The information relating to the operation status determined by the information type determining unit 52 is transmitted to the collective management server 82 through the communication I/F 72 and the communication network 80 illustrated in FIG. 4.

In addition, the information relating to the operation status determined by the information type determining unit 52 is temporarily stored in a temporary storing unit 53 and is transmitted to the index value calculating unit 54 at an appropriate time. A time measuring unit 56 and the vehicle-mounted management computer 16 are connected to the index value calculating unit 54, and the index value calculating unit 54 calculates an index value of each operation parameter according to the traveling environment for each predetermined period.

Here, an index value is a relative value of an execution frequency within the period described above when a recommendation value for each operation parameter is set as 100 in advance. For example, when a recommendation value of the number of times of stepping the accelerator for a period (e.g., 60 minutes) set in advance is 12 times (an index value of 100) in a general paved road, an index value of the number of times of stepping the accelerator of 20 is 167, and an index value of the number of times of stepping the accelerator of 6 is 50.

The index value calculating unit 54 is connected to a collation unit 58 and a table reading unit 60.

The index value calculating unit 54 transmits the index value as a result of the calculation to the collation unit 58 and instructs the table reading unit 60 to read a category classification determination table.

In other words, the vehicle-mounted management computer 16 is connected to the table reading unit 60, and the table reading unit 60 may recognize the current traveling environment of the vehicle 10. In addition, the category classification determination table storing unit 62 is connected to the table reading unit 60, and a category classification determination table (one of Tables 1 to 4) corresponding to the current traveling environment is selected and read.

In the category classification determination table storing unit 62, latest category classification determination tables (Tables 1 to 4) are appropriately updated and registered by the collective management server 82 illustrated in FIG. 4 through the communication I/F 72.

The category classification determination table (one of Tables 1 to 4) read by the table reading unit 60 is transmitted to the collation unit 58.

The collation unit 58 specifies a category of the category classification determination table to which the index value received from the index value calculating unit 54 belongs.

A result of the specifying is transmitted to an operation status appropriateness determining unit 64 that is an example of a determination unit. The operation status appropriateness determining unit 64 reads notification information from a notification information storing unit 66 based on the specified category and notifies the information relating to the traveling status from a notification device 70 through a notification information output unit 68. The notification device 70 represents a monitor or a speaker mounted in the vehicle 10, and one or plural thereof may be used together.

For example, in a case where a monitor is applied as the notification device 70, on an expressway (see, e.g., Table 1), when an index value of the number of times of stepping the accelerator is 167, and the category is classified into C1e, a message for improving the driving state such as "This is dangerous driving due to frequent acceleration. Please be careful!" is displayed. In the meantime, when an index value of the number of times of stepping the accelerator is 50, and the category is classified as C1a, a message for improving such as "Please travel according to the surrounding flow on an expressway!" is displayed.

Hereinafter, operations according to the present exemplary embodiment will be described.

Figure 7:
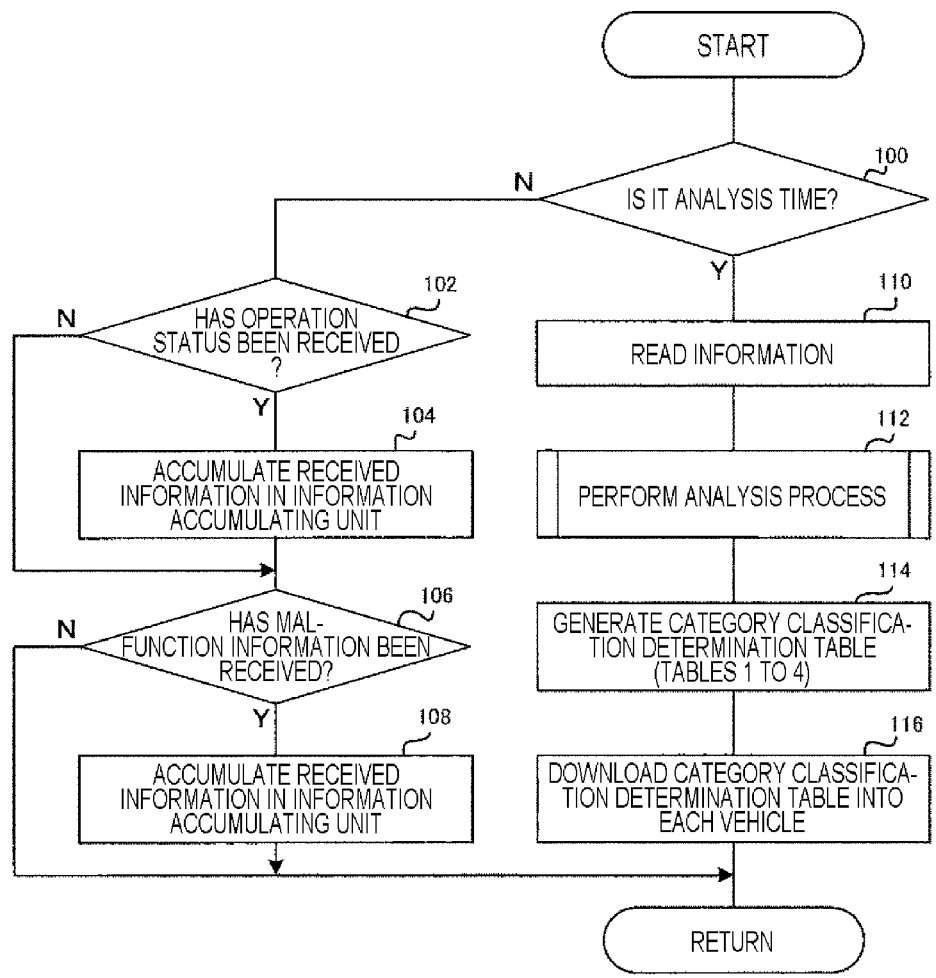
FIG. 7 is a flow chart that illustrates a sequence for generating a category classification determination table in a collective management server according to the present exemplary embodiment.

FIG. 7 is a flowchart that illustrates the sequence for generating the category classification determination tables illustrated in FIG. 5 in the collective management server 82.

In Step 100, it is determined whether or not it is an analysis time. In a case where "No" is determined, the process proceeds to Step 102, and it is determined whether or not the operation status information has been received. In a case where "Yes" is determined in Step 102, the process proceeds to Step 104, the received operation status information is temporarily accumulated in the information accumulating unit 75, and the process proceeds to Step 106. In the meantime, in a case where "No" is determined in Step 102, the operation status information has not been received, and accordingly, the process proceeds to Step 106.

In Step 106, it is determined whether or not malfunction information has been received. In a case where "Yes" is determined in Step 108, the process proceeds to Step 108, the received malfunction information is temporarily accumulated in the information accumulating unit 75, and this routine ends. In the meantime, in a case where "No" is determined in Step 106, the malfunction information has not been received, and accordingly, this routine ends.

In addition, in a case where "Yes" is determined in Step 100, it is determined that it is an analysis time, and the process proceeds to Step 110.

In Step 110, the operation status information and the malfunction information that have been accumulated are collectively acquired from the information accumulating unit 75, and thereafter, the process proceeds to Step 112, and an analysis process is performed. A well-known cluster analysis may be applied to the analysis process.

In the next Step 114, category classification determination tables (see, e.g., Tables 1 to 4) are generated based on a result of the analysis, and the process proceeds to Step 116. In Step 116, the generated category classification determination tables are downloaded into each vehicle 10, and this routine ends.

Here, the download of the generated category classification determination table into each vehicle 10 may be configured to be performed when there is a request from the vehicle 10 side instead of one-sidedly performing the download on the collective management server 82 side. In such a case, at least, a function may need to be included for temporarily storing latest category classification determination tables that have been generated.

In addition, the category classification determination tables may be provided for the base maintenance factories 90 or the private maintenance factories 92 instead of being directly downloaded into the vehicle 10.

Figure 8:
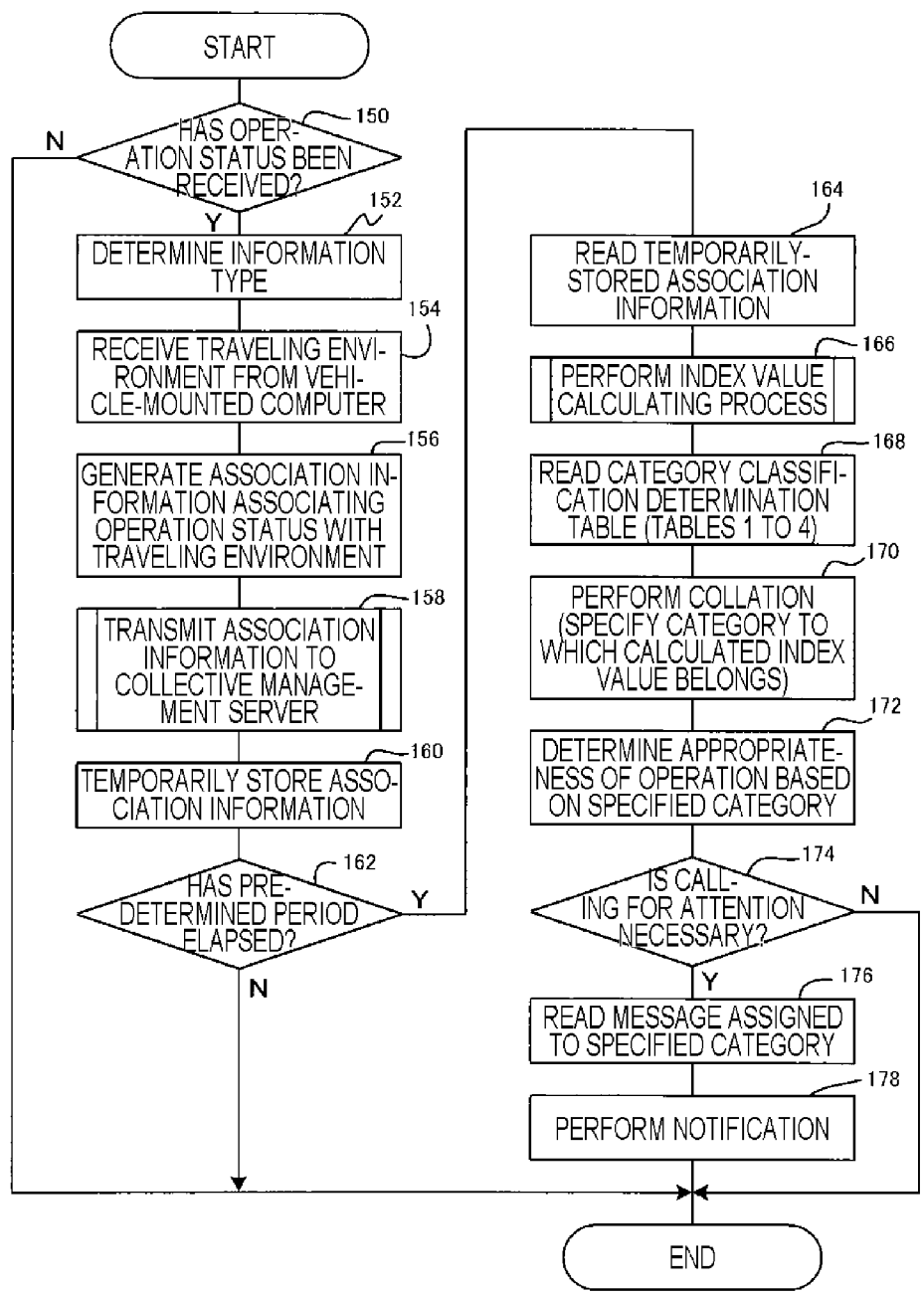
FIG. 8 is a flowchart of a monitoring control for performing an analysis of an operation status, acquisition of traveling environments, providing of information of a traveling status, and a determination of appropriateness of the traveling status in an environment analyzing controller according to the present exemplary embodiment.

FIG. 8 is a flowchart for the environment analyzing controller 14 to perform a monitoring control for performing an analysis of the operation status, acquisition of the traveling environment, providing the information of the traveling status, and a determination of the appropriateness of the traveling status.

In Step 150, it is determined whether or not a detection signal detected from each of the sensors (in this exemplary embodiment, the steering wheel sensor 22, the accelerator sensor 28, and the brake sensor 32), in other words, the information relating to the operation status has been received. In a case where "No" is determined in Step 150, the vehicle 10 is determined to be in a non-traveling state, and this routine ends.

In the meantime, in a case where "Yes" is determined in Step 150, the process proceeds to Step 152, the type of the received information relating to the operation status (a steering wheel operation, an accelerator operation, or a brake operation) is determined, thereafter, the process proceeds to Step 154, and the information relating to the traveling environment is received from the vehicle-mounted management computer 16. The information relating to the traveling environment may be basically acquired from the navigation system 20. In addition, for example, information relating to the weather may be recognized based on a detection signal detected from the wiper sensor 24. Furthermore, for example, information relating to day/night may be recognized based on a detection signal detected from the headlight sensor 26.

In the next Step 156, association information associating the information relating to the operation status with the traveling environment is generated. Thereafter, the process proceeds to Step 158, the generated association information is transmitted to the collective management server 82 illustrated in FIG. 4, and the process proceeds to Step 160. According to this transmission, "Yes" is determined in Step 102 illustrated in FIG. 7.

In Step 160, the association information is temporarily stored, the process proceeds to Step 162, and it is determined whether or not predetermined periods have elapsed. The predetermined periods, for example, may overlap with each other such as a period from the first of this month to the first of the next month and a period from the fifth of this month to the fifth of the next month. In addition, each period may be converted into a traveling distance of the vehicle 10.

In a case where "No" is determined in Step 162, it is determined that it is not a time for determining the appropriateness of the operation based on the association information that has temporarily been stored, and this routine ends.

In a case where "Yes" is determined in Step 162, it is determined that it is a time for determining the appropriateness of the operation based on the association information that has been temporarily stored, the process proceeds to Step 164, and the temporarily-stored association information is read. Thereafter, the process proceeds to Step 166, and an index value calculating process is performed.

Here, an index value is a relative value of an execution frequency within the period described above when a recommendation value of each operation parameter is set to 100 in advance.

In the next Step 168, the category classification determination tables (Tables 1 to 4) provided (see, e.g., Step 116 illustrated in FIG. 7) from the collective management server 82 (see, e.g., FIG. 4) are read. Thereafter, the process proceeds to Step 170, and a collation process for specifying a category to which the calculated index value belongs is performed.

In the next Step 172, the appropriateness of the operation is determined based on the specified category. In the present exemplary embodiment, when, in any table, in other words, in any road status, the level c is set as a recommendation value, and the calculated index value belongs to the category of the level c, the operation may be determined to be appropriate.

In the next Step 174, based on the determination of the appropriateness of the operation, it is determined whether or not calling for attention is necessary.

When it is determined to be "No" in Step 174, i.e., when it is determined that a calling for an attention is not necessary in step 174, this indicates a time when the index value calculated in Step 166 belongs to the level c, and in such a case, this routine ends.

In the meantime, in a case where "Yes" is determined in Step 174, the process proceeds to Step 176, and a message assigned to the specified category is read. Then, the process proceeds to Step 178, and the content of the message is displayed in a device (e.g., a monitor) mounted in the vehicle 10 for the notification.

In addition, also in a case where the calculated index value belongs to the level c, for example, a message for calling for an attention such as "Please maintain the operation in this way." may be assigned and notified.

(Modified Example 1)

In the present exemplary embodiment, the message for calling for an attention may be notified for each of the operation targets (e.g., a steering wheel operation, an accelerator operation, and a brake operation), or the appropriateness of the operation may be determined based on a comprehensive determination. In a case where such a comprehensive determination is performed, even when a certain operation does not belong to a recommendation value, the operation may still be determined to be appropriate by, for example, weighting each operation status.

(Modified Example 2)

In the present exemplary embodiment, in the category classification determination tables (Table 1 to 4) provided from the collective management server 82, basically, the index values are distributed by using the road status as the subject. However, each table used for the collation may be corrected according to a difference between the regions (e.g., a district boundary, a season, an average temperature, or average humidity), even for the same road status. That is, it may be configured such that the assignment of index values to each level is corrected based on the occurrence number of traffic accidents for each region, and the assignment of index values to each level may be corrected based on the number of registered vehicles for each region.

(Modified Example 3)

In the present exemplary embodiment, while the category classification determination tables (Tables 1 to 4) are generated according to the types of road on which the vehicle 10 travels, the category classification determination tables may be generated based on the vehicle type.

For example, in a case where the vehicle type is classified as a sport car, a category classification determination table that determines strictly may be generated.

However, while a sport car may easily speedup in general, depending on the manufacturer, there are many cases where emergency countermeasures (the brake performance, and the like) are strict in consideration of a speeding up. Accordingly, contrary to the general vehicles including sedans, category classification determination tables in which an acceleration operation, a steering wheel operation, and a brake operation are strictly determined may be generated.

In other words, the category classification determination tables may be generated by comprehensively determining the vehicle type and the manufacturers.

(Modified Example 4)

In this exemplary embodiment, while the category classification determination tables (Tables 1 to 4) are generated according to the type of road on which the vehicle 10 travels, the category classification determination tables may be generated based on classification information of operators (drivers).

In case of the vehicle 10, when an age group that tends to easily over-speed the vehicle is statistically recognized, different category classification determination tables may be generated according to the age.

In addition, in a case where the driving technique is recognized to be different according to the sex, category classification determination tables that are different according to the gender may be generated.

Furthermore, a category classification determination table that is specialized for so-called senior persons may be generated.

(Modified Example 5)

In the present exemplary embodiment, while the category classification determination tables are downloaded into each vehicle and the appropriateness of traveling is performed for each vehicle 10, it may be conceived that the collective management server 82 monitors each vehicle 10.

That is, the information relating to the operation status of a predetermined period (time) is acquired from the vehicle 10 first by using the communication network 80. At this time, the traveling environment is acquired from the navigation system 20 or the like, as association information.

Thereafter, the acquired association information (the information relating to the operation status) is analyzed through the cluster analysis or the like, and a category is specified based on an operator's category classification generated based on the information relating to the operation status acquired until the present time.

Information presentation, a notice, a warning, or the like corresponding to the specified category is notified to the vehicle 10 through the communication network 80 or is notified to an operator through a communication terminal or the like.

The notification is continued, and the improvement progresses until the category becomes a recommendation category. When the category becomes the recommendation category, the operator may maintain a more stable operation method by constantly maintaining the recommendation category, and as a result, the occurrence of an accident or a breakdown due to an operational mistake or the like may be minimized.

(Modified Example 6)

In the present exemplary embodiment, while the information accumulating unit 75, the analysis unit 76, and the category classification determination table generating unit 78 serving as a generation unit have been described as the functions of the collective management server 82, each function (in other words, the functions as the generation unit) may be mounted as the function of the environment analyzing controller 14 of each vehicle 10. In other words, each vehicle 10 may independently perform the aggregation and the analysis of the information relating to the operation status, the generation of category classification determination tables, the acquisition of the information relating to the real-time operation status, and a determination and a notification of the category.

(Modified Example 7)

In the present exemplary embodiment, while the category classification based on the information relating to the operation status has been illustrated in Tables 1 to 4, parameters such as an engine revolution number, on/off of the air-conditioner, and opening/closing of windows may be acquired and processed as additional information relating to the operation status. Then, the category classification is performed also in consideration of such parameters, and accordingly, the operators may be classified in consideration of the actual situations, whereby information presentation for the operation toward a safer side may be performed.

(Modified Example 8)

In the present specification, an operating body includes a moving body represented by a train, an automobile, a ship, and an airplane, and is applied to a transportation device. In the present exemplary embodiment, an automobile has been illustrated as an example of the operating body (e.g., a "vehicle 10").

In the present exemplary embodiment, the calling for an attention is performed for operator's (driver's) safe driving by using the information relating to the operation status of the vehicle 10 as a representative example of the moving body. However, a message for urging a safe operation may be notified by successively acquiring information relating to an operation status of a case where an operating body accompanying no movement, for example, a machine placed at a specific position.

For example, in the machine tools including a lathe, a milling machine, and a drilling machine, there is a possibility that an accident influencing a human body occurs in case of a wrong operation sequence. For this reason, it may be configured such that the category classification determination tables are generated based on the operation sequence and the operation reference, and the operation is monitored.

In addition, without being limited to the machine tools, a careless accident may be avoided similarly in the image forming apparatuses including a rotary press and a printing machine by collectively managing a routine operation status and calling for attention.

In a case where an operating body including a moving body such as a vehicle is operated, it may be considered that operator's operation status influences much on the degree of occurrence of a malfunction including an accident and a breakdown. A correlation between an operation status and the occurrence of a malfunction is not unique but may be changed according to the operation conditions including the type of operating body, an operation environment, and an operation status.

According to the present exemplary embodiment, the information relating to operation statuses of operators is acquired, category classification determination tables are generated in advance based on the information relating to the operation status until the present from each operator, a category to which the information relating to the operation status belongs is specified based on the acquired information relating to the operation status, and information presentation, a notice, a warning, or the like that is necessary may be performed based on the belonging category. Accordingly, the information relating to the operation status until the present may be effectively used, and the occurrence of an accident and a breakdown due to an operation mistake or the like may be drastically reduced in advance.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A monitoring apparatus comprising:
   an acquiring unit that acquires information relating to an operation status when an operating body is operated;
   a determination unit that determines one of a plurality of categories of the operation status, which are classified based on a degree of occurrence of a malfunction of the operating body or a degree of danger of the operation status, to which the information relating to the operation status acquired by the acquiring unit belongs;
   an attention calling unit that calls for an attention for an operation of the operating body in a case where the information relating to the operation status is determined to belong to a specific category; and
   a generation unit that generates a correlation table classified into a plurality of categories by aggregating the information relating to the operation status changing in a time series during a period set in advance before a determination time by the determination unit and by analyzing a degree of occurrence of a malfunction of the operating body for the information relating to each operation status,
   wherein the determination unit determines a category to which the information relating to the operation status acquired by the acquiring unit belongs based on the correlation table.

2. The monitoring apparatus according to claim 1,
   wherein the operating body is an automobile, and
   wherein an operation target includes at least one of a rotating operation of a steering wheel, a stepping operation of an accelerator and a stepping operation of a brake in the automobile.

3. The monitoring apparatus according to claim 1,
   wherein the acquiring unit, in case of acquiring the information relating to the operation status, acquires the information in association with environment information during the operation.

4. The monitoring apparatus according to claim 2,
   wherein the acquiring unit, in case of acquiring the information relating to the operation status, acquires the information in association with environment information during the operation.

5. The monitoring apparatus according to claim 1,
   wherein the categories applied by the determination unit are appropriately updated by applying information relating to an operation status that is newly acquired by the acquiring unit.

6. The monitoring apparatus according to claim 2,
   wherein the categories applied by the determination unit are appropriately updated by applying information relating to an operation status that is newly acquired by the acquiring unit.

7. The monitoring apparatus according to claim 3,
   wherein the categories applied by the determination unit are appropriately updated by applying information relating to an operation status that is newly acquired by the acquiring unit.

8. A monitoring system comprising:
a monitoring apparatus including an acquiring unit that acquires information relating to an operation status during operating an operating body, a storage unit that stores a correlation table classified into a plurality of categories by analyzing a degree of occurrence of a malfunction of the operating body, a determination unit that determines one of the plurality of classified categories to which the information relating to the operation status acquired by the acquiring unit belongs by referring to the correlation table stored in the storage unit, and an attention calling unit that calls for an attention for an operation of the operating body in a case where the information relating to the operation status is determined to belong to a specific category; and
a management server including a generation unit that generates the correlation table by aggregating information relating to operation statuses from a plurality of the monitoring apparatuses and by analyzing a degree of occurrence of a malfunction of the operating body for the information relating to each operation status and a notification unit that notifies the monitoring apparatus of the correlation table generated by the generation unit.

9. The monitoring system according to claim 8,
wherein the operating body is an automobile, and
wherein an operation target includes at least one of a rotating operation of a steering wheel, a stepping operation of an accelerator and a stepping operation of a brake in the automobile.

10. The monitoring system according to claim 8,
wherein the acquiring unit, in case of acquiring the information relating to the operation status, acquires the information in association with environment information during the operation.

11. The monitoring system according to claim 9,
wherein the acquiring unit, in case of acquiring the information relating to the operation status, acquires the information in association with environment information during the operation.

12. The monitoring system according to claim 8,
wherein the categories applied by the determination unit are appropriately updated by applying information relating to an operation status that is newly acquired by the acquiring unit.

13. The monitoring system according to claim 9,
wherein the categories applied by the determination unit are appropriately updated by applying information relating to an operation status that is newly acquired by the acquiring unit.

14. The monitoring system according to claim 10,
wherein the categories applied by the determination unit are appropriately updated by applying information relating to an operation status that is newly acquired by the acquiring unit.

* * * * *